(12) United States Patent
Awanohara

(10) Patent No.: US 9,151,960 B2
(45) Date of Patent: Oct. 6, 2015

(54) POLARIZATION CONVERSION ELEMENT, POLARIZATION CONVERSION UNIT, PROJECTION APPARATUS, AND METHOD FOR MANUFACTURING POLARIZATION CONVERSION ELEMENT HAVING A THIN ULTRAVIOLET LIGHT CURING ADHESIVE LAYER

(75) Inventor: Yoshinori Awanohara, Nagano (JP)

(73) Assignee: SEIKO EPSON CORPORATION, Tokyo (JP)

( * ) Notice: Subject to any disclaimer, the term of this patent is extended or adjusted under 35 U.S.C. 154(b) by 989 days.

(21) Appl. No.: 13/184,006

(22) Filed: Jul. 15, 2011

(65) Prior Publication Data
US 2012/0081671 A1 Apr. 5, 2012

(30) Foreign Application Priority Data

Oct. 1, 2010 (JP) ................................. 2010-224403

(51) Int. Cl.
*G02B 27/28* (2006.01)
*B32B 37/02* (2006.01)
(Continued)

(52) U.S. Cl.
CPC .............. *G02B 27/285* (2013.01); *B32B 37/02* (2013.01); *G02B 27/283* (2013.01); *G02B 27/286* (2013.01); *G03B 21/14* (2013.01); *H04N 9/3167* (2013.01); *B32B 38/0008* (2013.01); *B32B 2038/0076* (2013.01); *B32B 2309/105* (2013.01); *B32B 2310/0831* (2013.01);
(Continued)

(58) Field of Classification Search
CPC .............. G02B 27/283; G02B 27/285; G03B 21/2073; H04N 9/3167; B32B 2551/00; B32B 38/0008; B32B 2038/0076

USPC ............. 353/20; 359/485.01, 485.03, 485.04, 359/489.01, 489.06, 489.07
See application file for complete search history.

(56) References Cited

U.S. PATENT DOCUMENTS

| | | | |
|---|---|---|---|
| 5,096,520 A | * | 3/1992 | Faris ............................... 156/99 |
| 5,607,985 A | | 3/1997 | Masuhara et al. |

(Continued)

FOREIGN PATENT DOCUMENTS

| | | |
|---|---|---|
| JP | A-2000-298212 | 10/2000 |
| JP | A-2001-323239 | 11/2001 |

(Continued)

OTHER PUBLICATIONS

Atomic diffusion bonding of wafers with thin nanocrystalline metal films; T. Shimatsu and M. Uomoto; Journal of Vacuum Science & Technology B 28, 706 (2010); doi: 10.1116/1.3437515.*

*Primary Examiner* — Bao-Luan Le
(74) *Attorney, Agent, or Firm* — Oliff PLC

(57) ABSTRACT

A polarization conversion element is equipped with an element main body having a light incident surface and a light emission surface that are generally in parallel with each other, and a phase difference plate bonded to the light emission surface of the element main body. The element main body includes a plurality of light-transmissive substrates that are sequentially bonded at a predetermined angle with respect to the light emission surface, polarization separating films and reflection films that are alternately provided between the plurality of light-transmissive substrates, and adhesive layers formed between the plurality of light-transmissive substrates, respectively. The adhesive layers are each formed from ultraviolet light curing adhesive to a thickness between 5 μm and 10 μm.

8 Claims, 16 Drawing Sheets

(51) Int. Cl.
*G03B 21/14* (2006.01)
*H04N 9/31* (2006.01)
*G03B 21/20* (2006.01)
*B32B 38/00* (2006.01)

(52) U.S. Cl.
CPC ........ *B32B 2551/00* (2013.01); *G03B 21/2073* (2013.01); *Y10T 156/1052* (2015.01)

(56) References Cited

U.S. PATENT DOCUMENTS

| | | | |
|---|---|---|---|
| 6,084,714 A * | 7/2000 | Ushiyama et al. | 359/627 |
| 6,312,130 B2 | 11/2001 | Haba et al. | |
| 6,394,607 B1 * | 5/2002 | Hashizume et al. | 353/31 |
| 6,404,550 B1 * | 6/2002 | Yajima | 359/485.04 |
| 6,436,214 B1 * | 8/2002 | Murata | 156/99 |
| 6,523,962 B2 * | 2/2003 | Yajima | 353/121 |
| 6,542,298 B1 * | 4/2003 | Aoki | 359/485.03 |
| 6,669,797 B2 * | 12/2003 | Murata | 156/99 |
| 6,728,020 B2 * | 4/2004 | Akitaka | 359/256 |
| 6,846,079 B2 * | 1/2005 | Ogawa et al. | 353/20 |
| 6,992,748 B2 * | 1/2006 | Koh et al. | 349/196 |
| 7,011,412 B2 * | 3/2006 | Ogawa et al. | 353/20 |
| RE40,251 E * | 4/2008 | Ogawa et al. | 359/485.03 |
| 7,538,944 B2 * | 5/2009 | Matsuba et al. | 359/489.11 |
| 7,995,275 B2 * | 8/2011 | Maeda et al. | 359/485.01 |
| 8,109,637 B2 * | 2/2012 | Okuyama et al. | 353/20 |
| 8,279,523 B2 * | 10/2012 | Yamada et al. | 359/485.04 |
| 8,300,312 B2 * | 10/2012 | Kobayashi et al. | 359/485.04 |
| 2005/0168697 A1 * | 8/2005 | Bruzzone et al. | 353/20 |
| 2006/0180262 A1 * | 8/2006 | Fuse et al. | 156/99 |
| 2008/0278690 A1 * | 11/2008 | Maeda et al. | 353/20 |
| 2008/0316431 A1 * | 12/2008 | Okuyama et al. | 353/20 |
| 2009/0015794 A1 | 1/2009 | Sakai | |
| 2009/0052031 A1 * | 2/2009 | Yamada et al. | 359/494 |
| 2010/0134885 A1 * | 6/2010 | Kobayashi et al. | 359/488 |
| 2010/0151231 A1 | 6/2010 | Matsuo et al. | |
| 2010/0200144 A1 * | 8/2010 | Matsuo | 156/60 |
| 2010/0246368 A1 * | 9/2010 | Oto | 369/112.23 |

FOREIGN PATENT DOCUMENTS

| | | |
|---|---|---|
| JP | B2-3309846 | 7/2002 |
| JP | B2-3442776 | 9/2003 |
| JP | B2-3610764 | 1/2005 |
| JP | B2-3990004 | 10/2007 |
| JP | A-2009-069809 | 4/2009 |
| JP | B2-4329852 | 9/2009 |
| JP | B2-4337935 | 9/2009 |
| JP | A-2010-46696 | 3/2010 |
| JP | A-2010-089108 | 4/2010 |
| JP | A-2010-101992 | 5/2010 |
| JP | A-2010-113056 | 5/2010 |
| JP | A-2010-152044 | 7/2010 |

* cited by examiner

Embodiment example 2

Embodiment example 3

Embodiment example 4

Embodiment example 5

Embodiment example 6

Embodiment example 7

Embodiment example 8

Embodiment example 9

Embodiment example 10

Embodiment example 11

POLARIZATION CONVERSION ELEMENT, POLARIZATION CONVERSION UNIT, PROJECTION APPARATUS, AND METHOD FOR MANUFACTURING POLARIZATION CONVERSION ELEMENT HAVING A THIN ULTRAVIOLET LIGHT CURING ADHESIVE LAYER

BACKGROUND

1. Technical Field

The present invention relates to polarization conversion elements, polarization conversion units, projection apparatuses, and methods for manufacturing polarization conversion elements.

2. Related Art

Typically, a polarization conversion element that convers light of a light source into one type of polarized light is incorporated in a projection apparatus such as a projector. The polarization conversion element includes an element main body having a plurality of light-transmissive members with polarization separating films and reflection films alternately provided therebetween, and adhesive layers that are formed with adhesive between the plural light-transmissive members. Phase difference plates are selectively disposed on a light emission surface of the element main body (see, for example, JP-A-2000-298212 and Japanese Patent 3309846).

As shown in FIGS. 15 and 16, in fabricating the polarization conversion element described above, first, light-transmissive plate members with polarization separating films 91 and reflection films 92 formed thereon, and light-transmissive plate members without the aforementioned films formed thereon are alternately laminated with adhesive layers 93. The thickness of each of the adhesive layers 93 may reach, for example, about 20 μm. A laminate body of the laminated members is cut at a predetermined angle with respect to a surface of the laminated body to obtain an element main body. Then, cut surfaces of the element main body 95 are polished to form a light incident surface 951 and a light emission surface 952. Then, a phase difference plate 97 is bonded to the element main body 95 through a bonding layer 96.

However, for example, when the polarization conversion element described in JP-A-2000-298212 and Japanese Patent 3309846 is fabricated using adhesive of related art, the adhesive layer 93 would become thick as the adhesive has high viscosity. When the laminate body having such thick adhesive layers 93 is cut, strain would be generated at end sections of the adhesive layers 93. When the cut surfaces are polished with the strain being present, corner sections 981 of the light-transmissive members 98 near the adhesive layers 93 would be carved, as shown in FIGS. 15 and 16.

For example, if the bonding layer 96 is formed by a plasma polymerization method described, for example, in JP-A-2010-113056, some problems would arise. For example, a gap may be generated at the bonding layer 96 such that the phase difference plate 97 would likely be separated, and air bubbles may be formed in the bonding layer 96 such that its light transmissivity would be lowered. Also, if the phase difference plate 97 is bonded to the light emission surface 952A by adhesive, the area through which light is effectively transmitted becomes smaller because the corner sections 981 of the light-transmissive member 98 are cut near the adhesive layers 91.

SUMMARY

In accordance with an advantage of some aspects of the invention, a polarization conversion element having a long service life and excellent optical property, and a polarization conversion unit and a projection apparatus using the polarization conversion element are provided. Also, a method for manufacturing such a polarization conversion element is provided.

Application Example 1

A polarization conversion element in accordance with Application Example 1 pertains to a polarization conversion element that is equipped with an element main body having a light incident surface and a light emission surface that are generally in parallel with each other, and a phase difference plate bonded to the light emission surface of the element main body. The element main body includes a plurality of light-transmissive substrates that are sequentially bonded at a predetermined angle with respect to the light emission surface, polarization separating films and reflection films that are alternately provided between the plurality of light-transmissive substrates, and adhesive layers formed between the plurality of light-transmissive substrates. The adhesive layers are each formed from ultraviolet light curing adhesive to a thickness between 5 μM and 10 μm.

In the application example described above with such a configuration, the thickness of the adhesive layer is 5 μm or greater such that, even when dirt enters the adhesive layer, the influence of the dirt can be reduced due to the elasticity of the adhesive layer, and the light-transmissive substrates can be well adhered together. Further, as a special cleaning step for completely removing dirt and the like does not need to be provided, the manufacturing efficiency can be improved. On the other hand, the thickness of the adhesive layer is 10 μm or less, which is very thin, such that corner sections of the light-transmissive substrates would not be carved when the light incident surfaces are polished. Accordingly, the element main body and the phase difference plate can be strongly bonded together by, for example, a plasma polymerization method, without a gap. Therefore, the polarization conversion element can be provided with a long service life and excellent optical property.

Application Example 2

In a polarization conversion element in accordance with Application Example 2, the adhesive layer may include modified acrylate or modified methacrylate as a main composition. As the application example with the configuration described above includes modified acrylate or the like as a main composition, its viscosity is relatively low, such that the thickness of the adhesive layer can be set between 5 μm and 10 μm. As a result, generation of strain at end sections of the adhesive layers can be prevented, and therefore the corner sections of the light-transmissive members can be prevented from being cut at the time of polishing the light incident surface. Also, the adhesive layer is excellent in heat resistance property as it contains modified acrylate or modified methacrylate as the main composition, whereby a polarization conversion element with a much longer service life can be provided.

Application Example 3

In a polarization conversion element in accordance with Application Example 3, the light-transmissive substrate and the phase difference plate may be bonded by a bonding layer. The bonding layer may be formed by a plasma polymerization method and may include siloxane bonds, including Si backbones having a crystallinity of 45% or less and leaving groups composed of organic bases that bond to the Si backbones, and having adhesion that is expressed as a result of the leaving groups present near the surface leaving from the Si backbones upon the application of energy.

In the application example with the configuration described above, the thickness of the adhesive layer is between 5 μm and 10 μm, such that corner sections of the light-transmissive substrates would not be carved, and therefore the bonding layer can be formed by the plasma polymerization method without a gap and therefore the light-transmissive members and the phase difference plate can be strongly bonded together.

Application Example 4

In a polarization conversion element in accordance with Application Example 4, the light-transmissive substrates and the phase difference plate are bonded together by the bonding layer. The bonding layer may be formed by an atomic diffusion bonding method in which a microcrystalline continuous thin film provided on the light-transmissive substrate and a microcrystalline continuous thin film provided on the phase difference plate are contacted to each other, thereby causing atomic diffusion at a contact interface between and in crystal grains of the microcrystalline continuous thin film provided on the light-transmissive substrate and the microcrystalline continuous thin film provided on the phase difference plate. Alternatively, the bonding layer may be formed by an atomic diffusion bonding method in which a microcrystalline continuous thin film provided on one of the light-transmissive substrate and the phase difference plate and a microcrystalline structure provided on the other are brought into contact with each other, thereby causing atomic diffusion at a contact interface between and in crystal grains of the microcrystalline continuous thin film and the microcrystalline structure.

In the application example with the configuration described above, the thickness of the adhesive layer is between 5 μm and 10 μm, such that the bonding layer can be formed by the atomic diffusion bonding method without a gap and therefore the light-transmissive members and the phase difference plate can be strongly bonded together.

Application Example 5

In a polarization conversion element in accordance with Application Example 5, the phase difference plate may be formed from quartz crystal. In the application example with the configuration described above, quartz crystal has excellent heat resistance property, and therefore would not be readily deteriorated even after being irradiated with light for an extended period of time. Therefore, the polarization conversion element can have a much longer service life.

Application Example 6

A polarization conversion unit in accordance with Application Example 6 is equipped with any one of the polarization conversion elements described above, and a lens array disposed on a light incident side of the polarization conversion element. As the application example with such a configuration is equipped with one of the polarization conversion elements described above, the polarization conversion unit can have a long service life and excellent optical property.

Application Example, 7

A projection apparatus in accordance with Application Example 7 is equipped with a light source device that emits light, the polarization conversion unit described above that convers light emitted from the light source device into one type of polarized light, a light modulation device that modulates the polarized light from the polarization conversion unit according to image information to form an optical image, and a projection optical device that magnifies and projects the optical image formed by the optical modulation device. As the application example with this configuration is equipped with the polarization conversion element in accordance with any one of the application examples described above, the projection apparatus can have a long service life and excellent optical property.

Application Example 8

A method for manufacturing a polarization conversion element in accordance with Application Example 8 includes a film forming step of alternately providing polarization separating films and reflection films between a plurality of light-transmissive plate members each having a first surface and a second surface that are generally in parallel with each other, an adhering step of forming adhesive layers between the plurality of light-transmissive plate members, respectively, a cutting step of cutting the plurality of light-transmissive plate members at a predetermined angle with respect to the first surface and the second surface to form a laminate block having a light incident surface and a light emission surface that are generally in parallel with each other, a polishing step of polishing the light incident surface and the light emission surface of the laminate block to form an element main body, and a bonding step of bonding a phase difference plate to the light emission surface of the element main body. In one aspect, the adhesive layer is formed from ultraviolet light curing adhesive to a thickness between 5 μm and 10 μm. In the application example with such a configuration, the adhesive layer is formed from ultraviolet light curing adhesive in a thickness between 5 μm and 10 μm, such that a polarization conversion element having a long service life and excellent optical property can be obtained.

DESCRIPTION OF EXEMPLARY EMBODIMENTS

Configuration of Projection Apparatus

Figure 1:
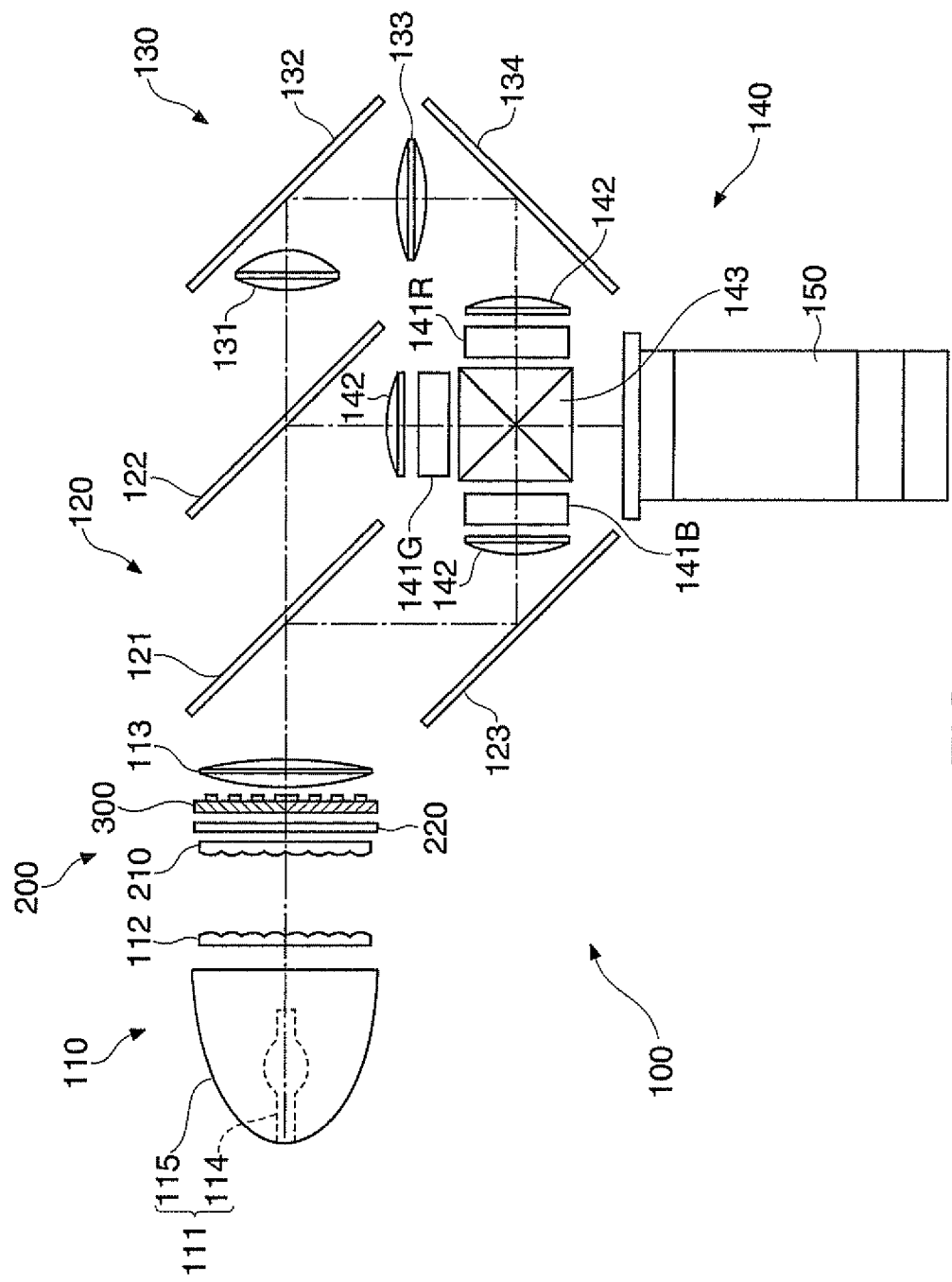
FIG. 1 is a schematic structural diagram of a projection apparatus in accordance with an embodiment of the invention.
Figure 2:
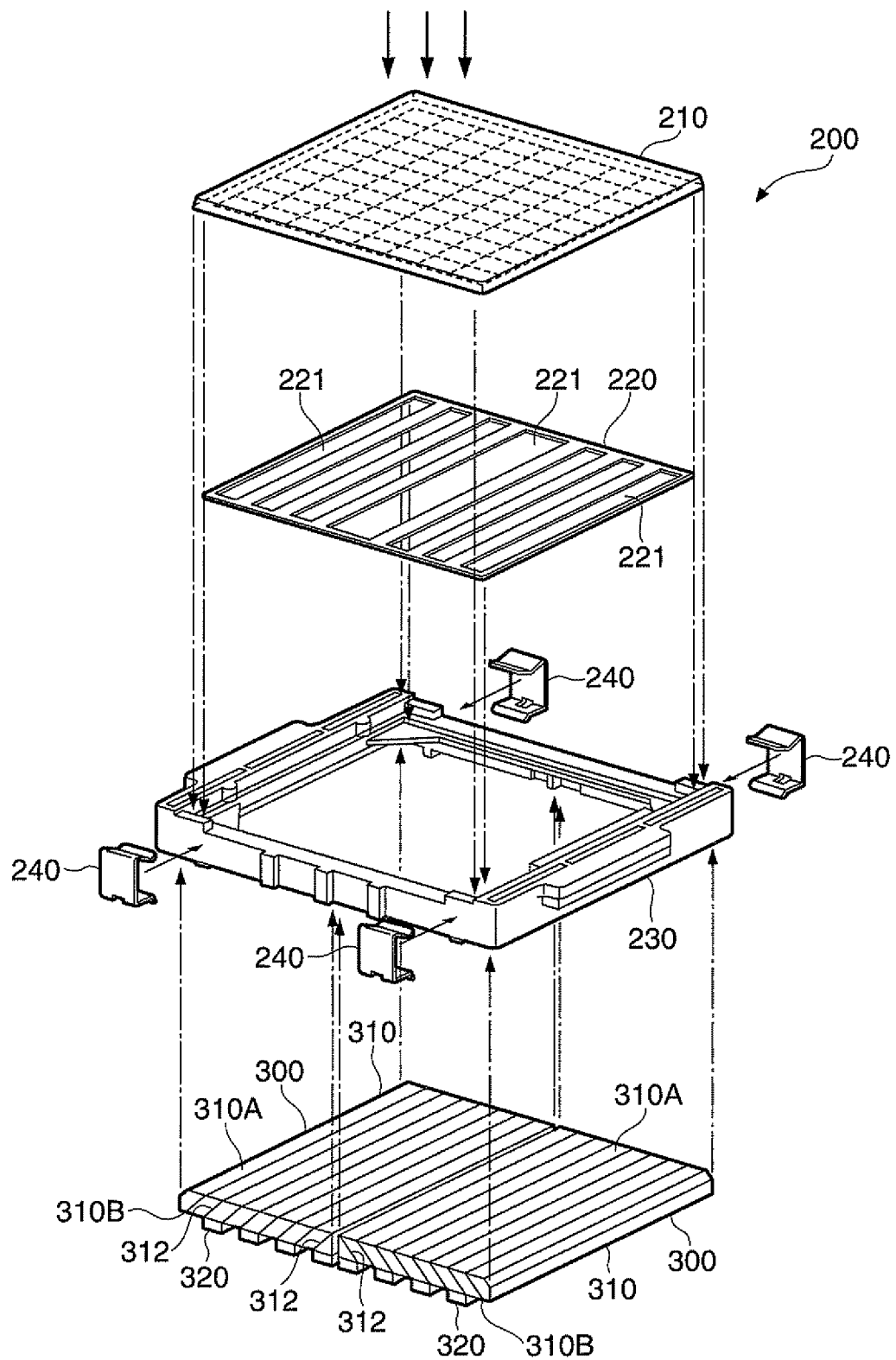
FIG. 2 is a schematic exploded perspective view of a polarization conversion unit provided in the projection apparatus.
Figure 3:
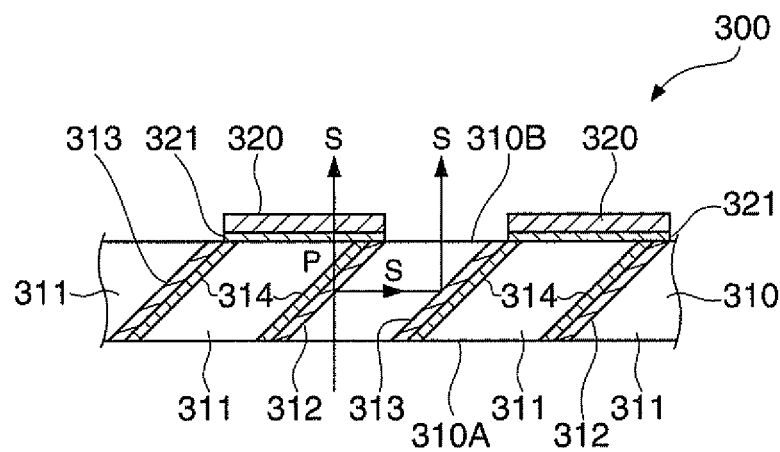
FIG. 3 is a cross-sectional view of a polarization conversion element provided in the projection apparatus.

A projection apparatus in accordance with an embodiment of the invention will be described with reference to FIGS. 1-3. The projection apparatus in accordance with the embodiment will be described using a liquid crystal projector as an example. FIG. 1 is a schematic structural view of a projector. FIG. 2 is an exploded perspective view of a polarization conversion unit provided in the projector. FIG. 3 is a cross-sectional view of a polarization conversion element provided in the projector. As shown in FIG. 1, the projector 100 is equipped with an integrator illumination optical system 110, a color splitting optical system 120, a relay optical system 130, an optical modulation device 140 that modulates light emitted from a light source according to image information, and a projection optical device 150 that magnifies and projects the light modified by the optical modulation device 140.

The integrator illumination optical system 110 is an optical system that substantially uniformly illuminates image forming regions of three transmissive liquid crystal panels 141 (liquid crystal panels 141R, 141G, and 141B for respective light components of red, green, and blue) constituting the light modulation device 140. The integrator illumination optical system 110 includes a light source device 111, a first lens array 112, a polarization conversion unit 200, and a superimposing lens 113.

The light source device 111 includes a light source lamp 114 and a reflector 117. A radiant light beam emitted from the light source lamp 114 is reflected by the reflector 115 and becomes a generally parallel light beam, and the generally parallel light beam is emitted to the outside.

The first lens array 112 has the configuration in which small lenses, each having a substantially rectangular contour as viewed along the optical axis direction, are arranged in a matrix.

The polarization conversion unit 200 has a function to convert light emitted from the first lens array 112 into one type of linearly polarized light beam. The polarization conversion unit 200 includes a second lens array 210, a light-shielding plate 220, a polarization conversion element 300, a frame 230 that retains the second lens array 210, the light-shielding plate 220 and the polarization conversion element 300, and fixing members 240 that affix the second lens array 210, the light-shielding plate 220 and the polarization conversion element 300 to the frame 230.

The second lens array 210 is disposed on the light incident side of the polarization conversion element 300, and has substantially the same configuration as the first lens array 112, that is, the configuration in which small lenses are arranged in a matrix. The second lens array 210, together with the superimposing lens 113, functions to form an image of each of the small lens of the first lens array 112 on the corresponding transmissive liquid crystal panel 141.

The light shielding plate 220 has a plurality of apertures 221 in the shape of slits, and the apertures 221 are arranged in a manner to correspond to polarization separating films 312 of the polarization conversion element 300. With this configuration, the light-shielding plate 220 allows light to enter only light incident surfaces 310A corresponding to the polarization separating films 312 of the polarization conversion element 300. It is noted that FIG. 2 only schematically shows the corresponding relation between the apertures 221 and the polarization separating films 312.

The polarization conversion element 300 converts light (P-polarized light and S-polarized light) from the second lens array 210 into one type of S-polarized light. In FIG. 1 and FIG. 2, two polarization conversion elements 300 are mutually bonded together.

In assembling the polarization conversion unit 200, the two polarization conversion elements 300 are inserted through one of the opening surfaces (the lower surface in FIG. 2) of the frame 230, and the light-shielding plate 220 and the second lens array 112 are inserted in this order through the other opening surface (the upper surface in FIG. 2). The second lens array 210, the light-shielding plate 220 and the polarization conversion element 300, while being stored in the frame 230, are retained by the four fixing members 240 in two opposing directions.

As shown in FIG. 1, the color separation optical system 120 includes two dichroic mirrors 121 and 122 and a reflecting mirror 123. The color separation optical system 120 separates a plurality of partial light fluxes emitted from the integrator illumination optical system 110 into light components of three colors of red (R), green (G), and blue (B) by the dichroic mirrors 121 and 122. The blue light component separated by the dichroic mirror 121 is reflected by the reflecting mirror 123, passes through a filed lens 142, and reaches a transmissive liquid crystal panel 141B for blue.

Out of the red light component and the green light component having transmitted the dichroic mirror 121, the green light component is reflected by the dichroic mirror 122, passes through a field lens 142, and reaches a transmissive liquid crystal panel 141G for green.

A relay optical system 130 includes an incident side lens 131, a relay lens 133, and reflecting mirrors 132 and 134. The red light component separated by the color separation optical system 120 transmits the dichroic mirror 122, passes through the relay optical system 130 and the field lens 142, and reaches a transmissive liquid crystal panel 141R for red.

The light modulation device 140 modulates incident light fluxes in accordance with image information to form a color image. The light modulation device 140 includes the transmissive liquid crystal panels 141R, 141G, and 141B, and a cross dichroic prism 143.

The cross dichroic prism 143 combines the optical images modulated for the respective color light components to form a color image. A dielectric multilayer film that reflects the red light component and a dielectric multilayer film that reflects the blue light component are substantially provided in an X shape along the interface of four right-angle prisms, and the three color light components are combined by the dielectric multilayer films.

The projection optical device 150 is configured with a plurality of projection lenses, and projects the light modulated by the light modulation device 140 on a magnified scale.

Configuration of Polarization Conversion Element

As shown in FIG. 3, the polarization conversion element 300 includes an element main body 310 and phase difference plates 320 selectively bonded to the element main body 310. The element main body 310 includes plural light-transmissive substrates 311, polarization separating films 312 and reflecting films 313 alternately provided between the plural light-transmissive substrates 311, and adhesive layers 314 respectively provided between the plural light-transmissive substrates 311. The plural light-transmissive substrates 311 each have a light incident surface 310A and a light emission surface 310B that are generally in parallel with each other. Among the light (S-polarized light and P-polarized light) outputted from the second lens array 210, the polarization separating films 312 selectively transmit the P-polarized light and reflect the S-polarized light. The reflecting films 313 reflect the S-polarized light reflected by the polarization separating films 312 toward the light emission surface 310B.

The adhesive layers 314 each have a thickness between 5 µm and 10 µm. The adhesive layers 314 are formed from ultraviolet light curing adhesive made of modified acrylate or modified methacrylate as a main composition, such that they can have a thickness in the range specified above. On the other hand, ultraviolet light curing adhesive of related art does not use modified acrylate or modified methacrylate as a main composition, such that its viscosity is high and therefore the thickness of an adhesive layer made of such adhesive would reach between 10 µm and 20 µm.

Figure 16:
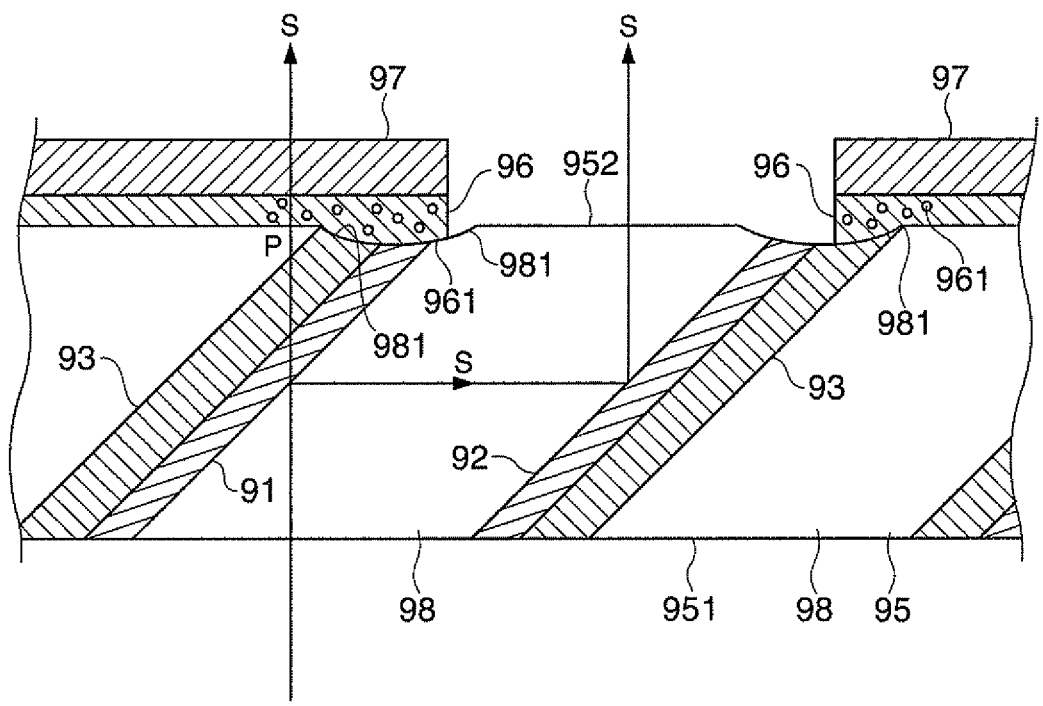
FIG. 16 is an enlarged cross-sectional view of FIG. 15.

When the thickness of the adhesive layer exceeds 10 µm, as in the case of an adhesive layer in related art, strain would be generated at end sections of the adhesive layers, in manufacturing the polarization conversion element. Therefore, when the light incident surface 310A and the light emission surface 310B are polished, corner sections of the light-transmissive substrates 311 near the strain would be carved (see, FIG. 16). As a result, when the phase difference plates 320 are bonded to the light emission surface 310B of the light-transmissive substrates 311, a gap would be generated between the light-transmissive substrates 311 and the phase difference plates 320 and air bubbles would be generated in the bonding layer. Therefore, the light-transmissive substrates 311 and the phase difference plates 320 would not be sufficiently bonded together, and the phase difference plates 320 would more likely peel off. In addition, the air bubbles formed between the light-transmissive substrates 311 and the phase difference plates 320 would reduce the light transmittance.

On the other hand, when the thickness of the adhesive layer is less than 5 µm, and dirt or the like enters the adhesive layer, the adhesion strength of the adhesive layer would be reduced by the dirt. As the adhesive used in the present embodiment, for example, UT20 and HR154 (trade names) manufactured by ADELL CORPORATION may be used.

The phase difference plates 320 are bonded to the light emission surface 310B of the light transmissive substrates 311 by bonding layers 321. The phase difference plate 320 is a half-wave plate made of quartz crystal, which converts P-polarized light passed through the polarization separating film 312 into S-polarized light. The bonding layers 321 are molecular-bonded plasma polymerized films, and are made of polyorganosiloxane as the main composition. The plasma polymerized film is made by a plasma polymerization method, and includes siloxane bonds, including Si backbones having a crystallinity of 45% or less and leaving groups composed of organic bases that bond to the Si backbones. The plasma polymerized film has adhesion that is expressed as a result of the leaving groups present near the surface leaving from the Si backbones upon the application of energy. Upon the application of energy, active hands are generated in the surface of and inside the plasma polymerized films, such that the plasma polymerized films express strong adhesion.

Method for Manufacturing Polarization Conversion Element

Figure 4:
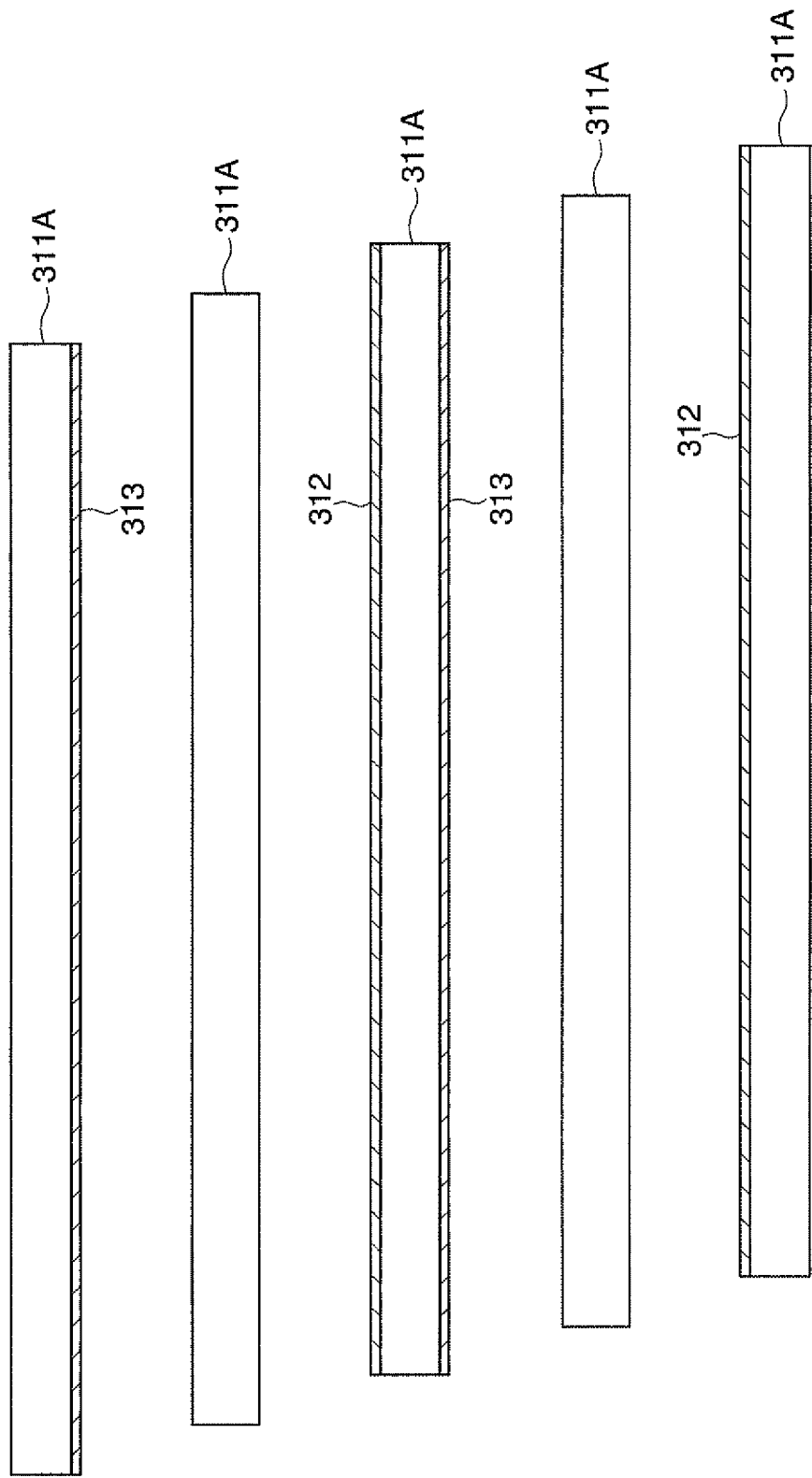
FIG. 4 is a view showing a film forming step in manufacturing the polarization conversion element in accordance with an embodiment of the invention.
Figure 5:
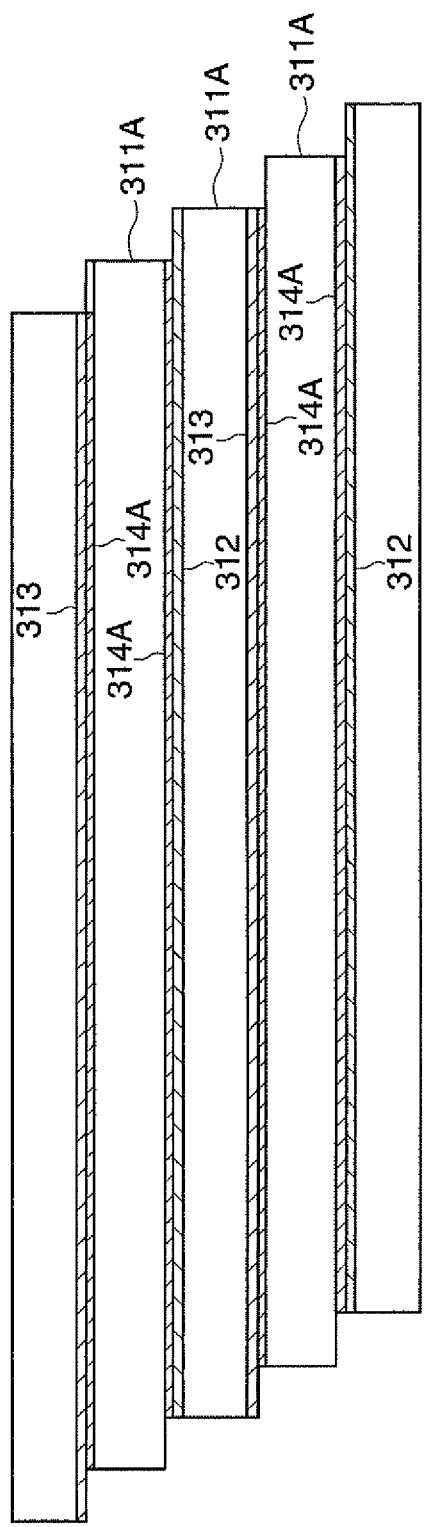
FIG. 5 is a view showing an adhering step in manufacturing the polarization conversion element.
Figure 6:
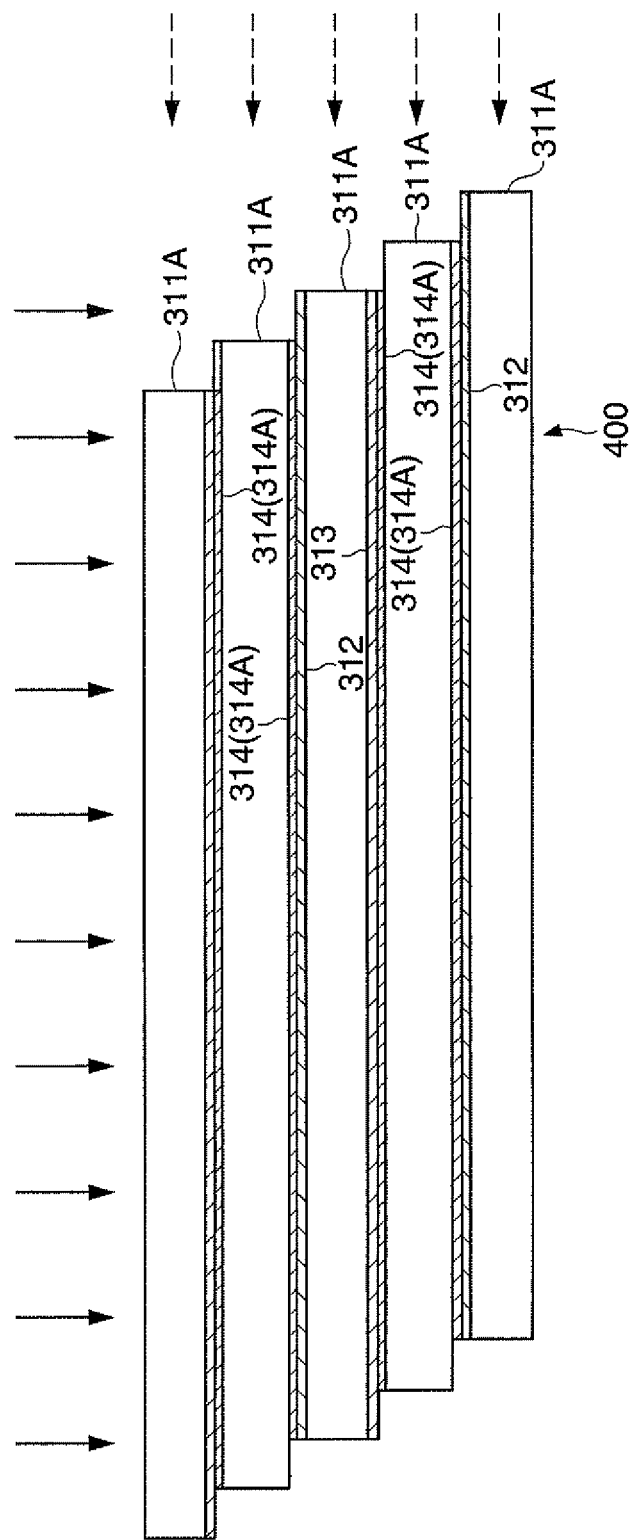
FIG. 6 is a view showing a state of ultraviolet light being irradiated in the adhering step.
Figure 7A:
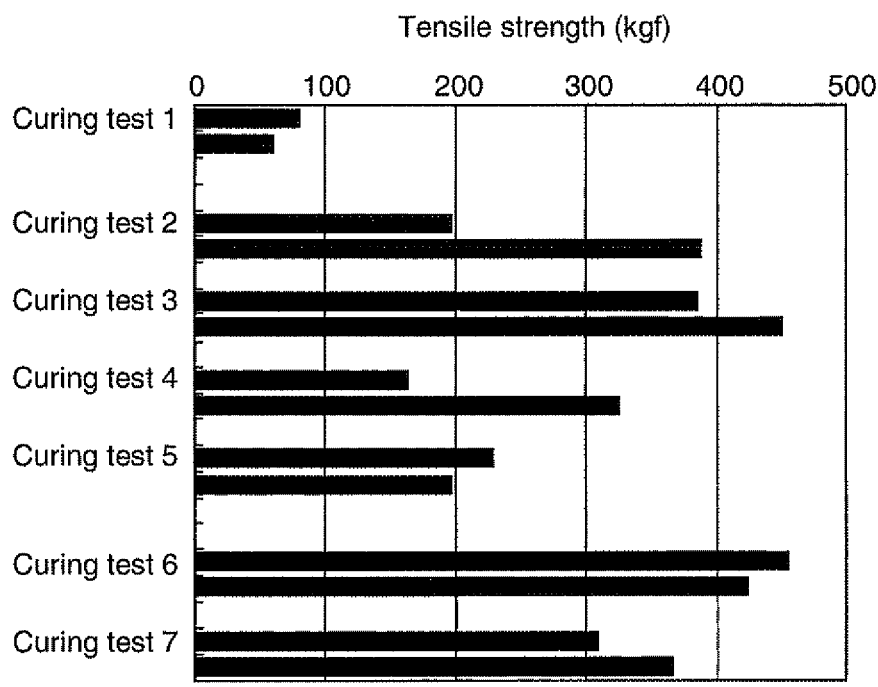
FIGS. 7A and 7B show results of measurement of tensile strength in curing test.
Figure 7B:
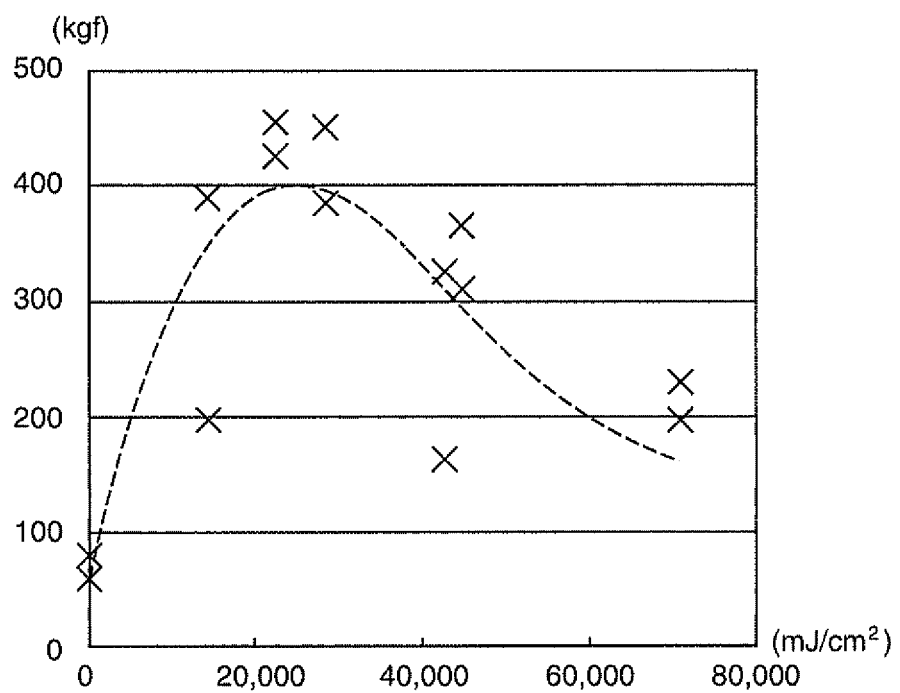
Figure 8A:
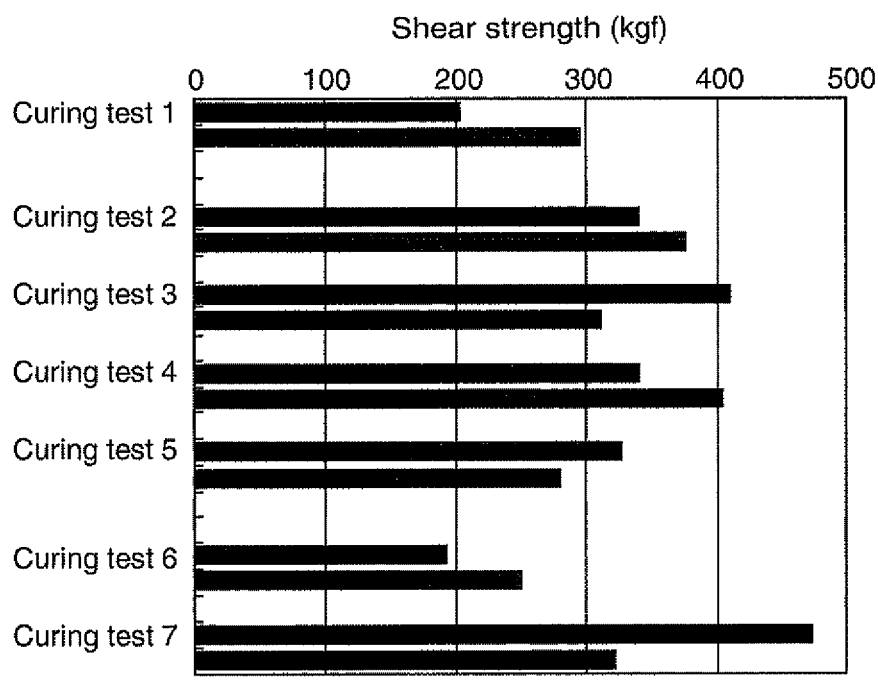
FIGS. 8A and 8B show results of measurement of shear strength in curing test.
Figure 8B:
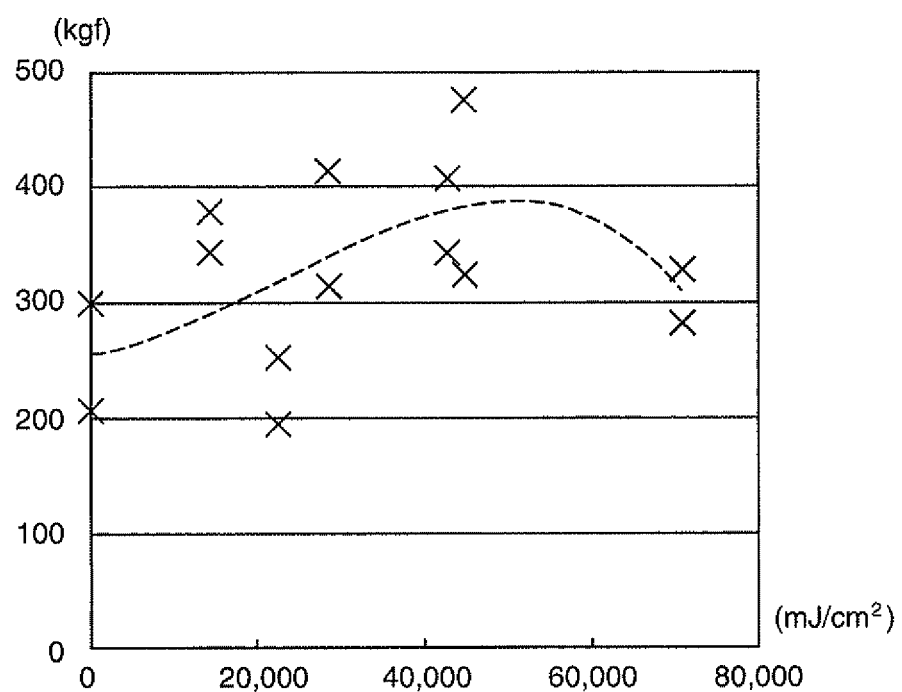
Figure 9:
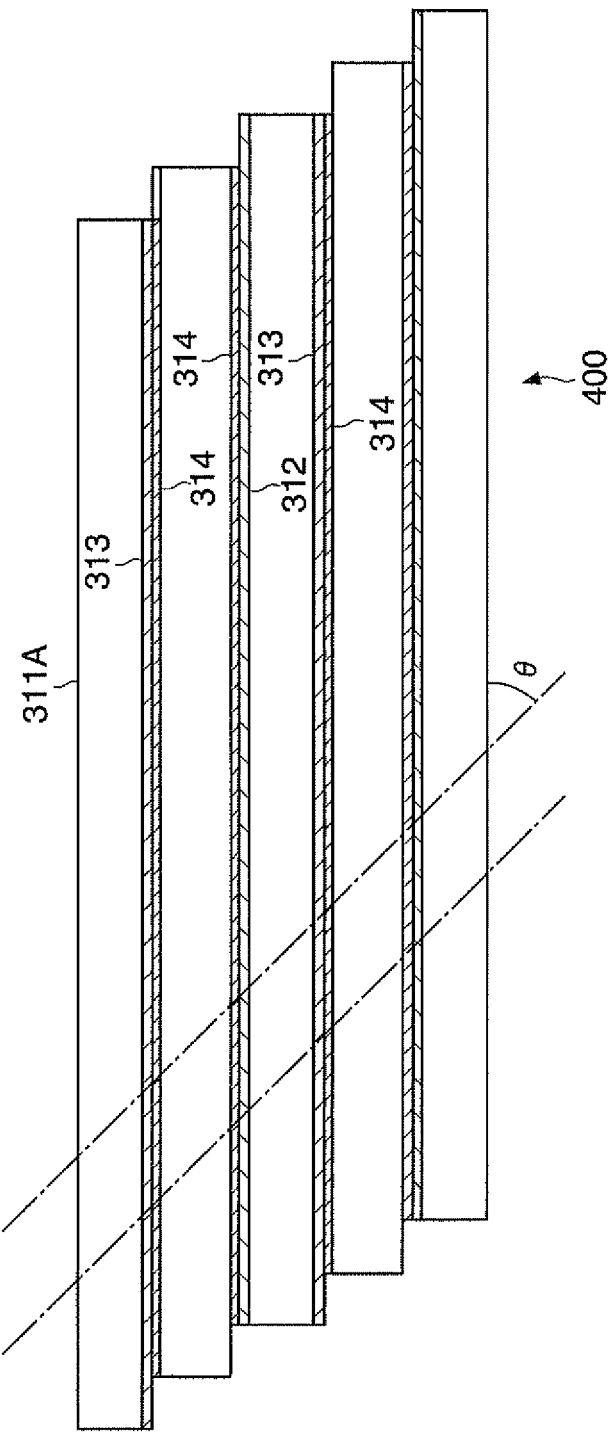
FIG. 9 is a view showing a cutting step in manufacturing the polarization conversion element.
Figure 10:
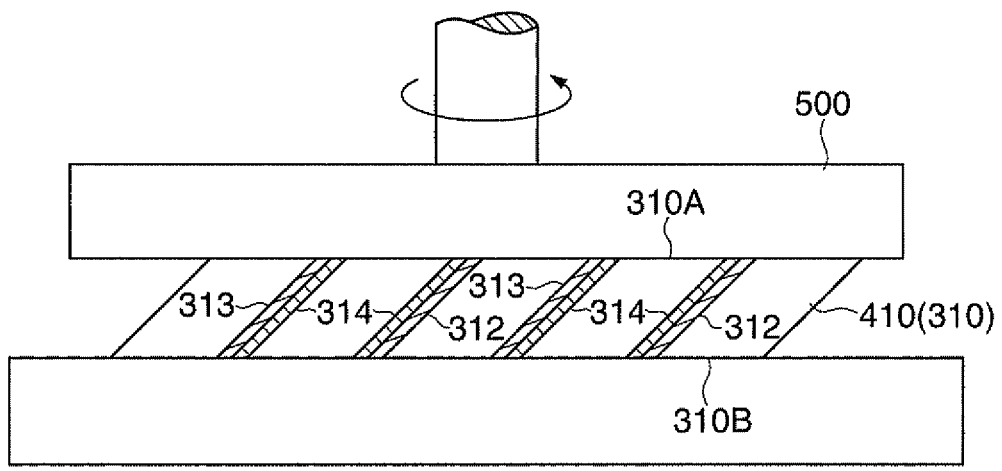
FIG. 10 is a view showing a polishing step in manufacturing the polarization conversion element.

Next, a method for manufacturing a polarization conversion element in accordance with an embodiment of the invention will be described with reference to FIGS. 4-9. FIG. 4 is a view showing a film forming step, FIG. 5 is a view showing an adhering step, and FIG. 6 is a view showing a state of ultraviolet light being irradiated in the adhering step. FIGS. 7A and 7B show results of measurement of tensile strength in curing test. FIGS. 8A and 8B show results of measurement of shear strength in curing test. FIG. 9 is a view showing a cutting step, and FIG. 10 is a view showing a polishing step. In the method for manufacturing a polarization conversion element, the film forming step, the adhering step, the cutting step, the polishing step and the bonding step are sequentially conducted.

Film Forming Step

In the film forming step, as shown in FIG. 4, plural light-transmissive plate members 311A are prepared. The light-transmissive plate members 311A each have a first surface 311A1 and a second surface 311A2 that are generally in parallel with each other. Polarization separating films 312 are formed on the first surface 311A1 of some of the light-transmissive plate members 311A, and reflecting films 313 on the second surface 311A2 thereof. No such films are formed on the first surface 311A1 and the second surface 311A2 of the other of the light-transmissive plate members 311A.

Adhering Step

In the adhering step, as shown in FIG. 5, the light-transmissive plate members 311A with the polarization separating films 312 and the reflecting films 313 formed thereon and the light-transmissive plate members 311A without these films formed thereon are alternately bonded together by adhesive 314A. The amount of the adhesive 314A to be coated is adjusted such that the thickness of the layer after curing would be between 5 µm and 10 µm.

Further, in the adhering step, as shown in FIG. 6, ultraviolet light is irradiated to the light-transmissive plate members 311A in a direction generally perpendicular to the first surface 311A1. Ultraviolet light passes through the polarization separating films 312 and the reflecting films 313. In this manner, as ultraviolet light is irradiated to the light-transmissive plate members 311A in a direction generally perpendicular to the first surface 311A1, the adhesive 314A is concurrently cured. As a result, adhesive layers 314 are formed between the polarization separating film 312 and the light-transmissive plate member 311A and between the reflecting film 313 and the next light-transmissive plate member 311A, respectively. In this manner, a laminate 400 having a plurality of light-transmissive plate members 311A bonded together is formed. It is noted that ultraviolet light may be irradiated in a direction generally in parallel with the first surface 311A1 of the light-transmissive substrate 311.

Relation between curing conditions for the adhesive 314A and bonding strengths of the adhesive layers 314 obtained by the respective curing conditions will be described. As shown in Table 1 below, the irradiation amount of ultraviolet light (UV) was changed to conduct Curing Test 1 through Curing Test 7. As a result, tensile strength shown in Table 1, and FIGS. 7A and 7B was obtained; and shear strength shown in Table 1, and FIGS. 8A and 8B was obtained. More specifically, as shown in FIGS. 7A and 7B, when the irradiation amount of ultraviolet light is between 15,000 mJ/cm$^2$ and 45,000 mJ/cm$^2$, in particular, when it is between 20,000 mJ/cm$^2$ and 35,000 mJ/cm$^2$, the tensile strength of the adhesive layer 314 becomes higher, which is favorable. Also, as shown in FIGS. 8A and 8B, when the irradiation amount of ultraviolet light is between 15,000 mJ/cm$^2$ and 60,000 mJ/cm$^2$, in particular, when it is between 25,000 mJ/cm$^2$ and 50,000 mJ/cm², the shear strength of the adhesive layer 314 becomes higher, which is favorable. It is noted that each of the curing tests in Table 1 was conducted twice, respectively.

The tensile strength test and the shear strength test were conducted using the following test methods. Two clear glass plates having the size of 10 mm×10 mm were bonded together by the adhesive 314A to form test pieces. A tensile load was applied to the test pieces thus formed by a tensile tester in a direction perpendicular to or in parallel with the bonded surface, and loads being applied at the time when the two clear glass plates were separated from each other were measured.

TABLE 1

| | Curing Condition | Strength Test | |
|---|---|---|---|
| Curing Test | UV Irradiation Amount [mJ/cm²] | Tensile Test [kgf] | Shear Test [kgf] |
| 1 | 319 | 80.9910 | 205.4220 |
| | | 60.8006 | 297.7320 |
| 2 | 14,419 | 198.2330 | 343.6190 |
| | | 389.2000 | 378.9010 |
| 3 | 28,519 | 385.3000 | 413.4440 |
| | | 450.9440 | 313.5120 |
| 4 | 42,619 | 164.2760 | 343.5930 |
| | | 325.8500 | 407.4280 |
| 5 | 70,819 | 229.9720 | 328.8330 |
| | | 198.2580 | 282.4610 |
| 6 | 22,504 | 455.7880 | 194.4600 |
| | | 425.1200 | 252.9660 |
| 7 | 44,689 | 310.5040 | 476.2840 |
| | | 365.3900 | 324.6270 |

Cutting Step, Polishing Step, Bonding Step

In the cutting step, as shown in FIG. 9, the laminate 400 is cut at generally parallel cutting surfaces (as shown in broken lines in the figure) at a predetermined angle θ with respect to the first surface 311A1, thereby cutting out a laminate block 410. The angle θ may preferably be about 45 degrees. In the polishing step, as shown in FIG. 10, cut surfaces 410A of the cut-out laminate block 410 are polished by a polishing apparatus 500 to obtain an element main body 310. Then, in the bonding step, phase difference plates 320 are bonded to the light emission surface 310B at locations corresponding to the polarization separating films 312 by a plasma polymerization method. Through the steps described above, a polarization conversion element 300 including the element main body 310 with the phase difference plates 320 bonded thereto is obtained.

According to the embodiment described above, the following effects can be obtained.

(1) The thickness of the adhesive layer 314 of the polarization conversion element 300 is 5 μm or greater such that, even when dirt enters the adhesive layer 314, the influence of the dirt can be reduced due to the elasticity of the adhesive layer 314, and the light-transmissive substrates 311 can be well adhered together. On the other hand, the thickness of the adhesive layer 314 is 10 μm or less, such that corner sections of the light-transmissive substrates 311 would not be carved when the light incident surface 310A is polished. Accordingly, the bonding layer 321 can be formed without a gap by, for example, a plasma polymerization method, whereby the element main body 310 and the phase difference plates 320 can be strongly bonded together.

(2) When the irradiation amount of ultraviolet light in forming the adhesive layer 313 is between 20,000 mJ/cm² and 35,000 mJ/cm², the tensile strength of the adhesive layer 314 can be made higher. Also, when the irradiation amount of ultraviolet light is between 25,000 mJ/cm² and 50,000 mJ/cm², the shear strength of the adhesive layer 314 can be made higher.

(3) The adhesive 314A that forms the adhesive layers 314 contains modified acrylate or modified methacrylate as the main composition, such that the thickness of the adhesive layer 314 can be set between 5 μm and 10 μm. Further, as the adhesive 314A is made of modified acrylate or the like as the main composition, and thus has excellent heat resistance property, a polarization conversion element 300 with a much longer service life can be realized.

(4) The thickness of the adhesive layer 314 is between 5 μm and 10 μm, such that corner sections of the light-transmissive substrates 311 would not be cut at the time of polishing. Accordingly, when the element main body 310 and the phase difference plate 320 are bonded together by a plasma polymerization method, air bubbles would not be formed in the bonding layer 321, such that good bonding strength and light transmissivity can be realized.

(5) The phase difference plate 320 is formed from quartz crystal that is excellent in heat resistance property, and thus would not readily be deteriorated even after prolonged light irradiation. Therefore, the polarization conversion element 300 can be made with a much longer service life.

(6) The projector 100 and the polarization conversion unit 200 are equipped with the polarization conversion element 300, such that the projector 100 and the polarization conversion unit 200 can be provided with a longer service life and excellent optical property.

(7) In the method for manufacturing a polarization conversion element in accordance with the embodiment of the invention, ultraviolet light curing adhesive is used in the adhering step to form the adhesive layer 314 in a thickness between 5 μm and 10 μm, such that the polarization conversion element 300 can be obtained with a long service life and excellent optical property.

It is noted that the invention is not limited to the embodiment described above, and modifications and improvements within the range that can achieve the object of the invention are deemed to be included in the invention. For example, the embodiment is described with a configuration in which the bonding layer is formed by a plasma polymerization method. However, the bonding layer may be formed by an atomic diffusion bonding method. According to the atomic diffusion bonding method, microcrystalline continuous thin-films are formed respectively on a light-transmissive substrate and a phase difference plate in a vacuum within a vacuum container by a vacuum film forming method such as sputtering, ion-plating or the like. Then, the microcrystalline continuous thin-films are laminated during film formation or after film formation, causing atomic diffusion in bonding interfaces and in crystal grains, whereby the light-transmissive substrates and the phase difference plate are strongly bonded together. Alternatively, instead of mutually superposing microcrystalline continuous thin-films, a microcrystalline continuous thin-film may be formed on one of the light-transmissive substrate and the phase difference plate, and a microcrystalline structure may be formed on the other. Then, atomic diffusion bonding can be achieved by mutually superposing the microcrystalline continuous thin-film and the microcrystalline structure.

Also in the embodiment described above, a configuration in which the phase difference plate is provided on the light emission surface corresponding to the polarization separating film is exemplified. However, without any limitation to the embodiment, the phase difference plate may be provided on the light emission surface corresponding to the reflection film. Also, in accordance with a modified example, phase difference plates may further be provided, superposed over the polarization separating film and the reflecting film. In this case, polarized light passing through the polarization separating film is emitted from the light emission surface as is. On the other hand, polarized light reflected by the polarization separating film is further reflected by the reflection film and emitted from the light emission surface, and its phase is converted by the phase difference plate (a half wave plate). Therefore, light emitted from the polarization conversion element in accordance with the modified example has a polarization state aligned with P-polarized light. Further, although the polarization conversion element is used in a projector in the embodiment described above, the polarization conversion element can be used in any other apparatuses, such as, for example, an imaging apparatus or the like.

EMBODIMENT EXAMPLES

Embodiment examples of the invention will be described below. It is noted that the invention is not limited to the embodiment example.

Heat Resistance Property Test

Embodiment Example 1 and Comparison Example 1

Figure 11:
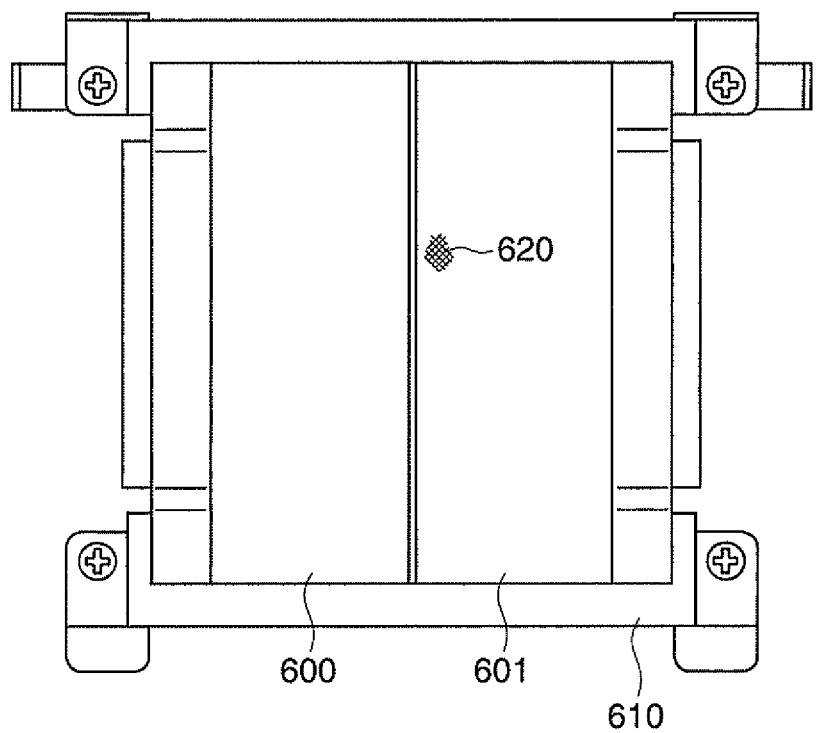
FIG. 11 shows results of heat resistance property test conducted on an embodiment example of the invention and a comparison example.
Figure 12A:
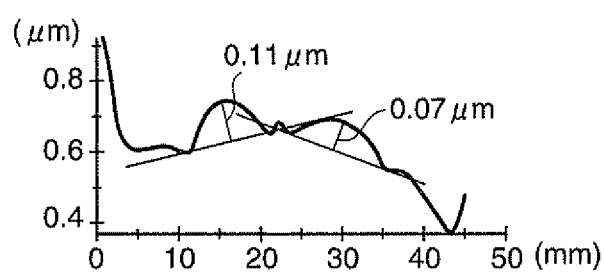
FIGS. 12A-12E show results of flatness test conducted on embodiment examples of the invention.
Figure 12B:
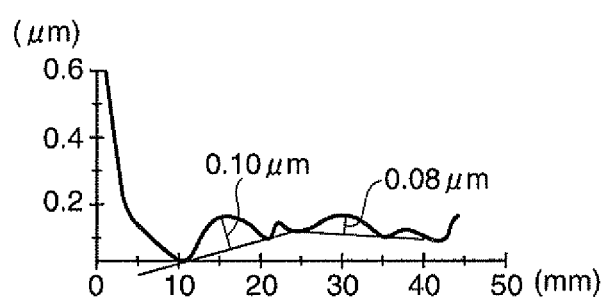
Figure 12C:
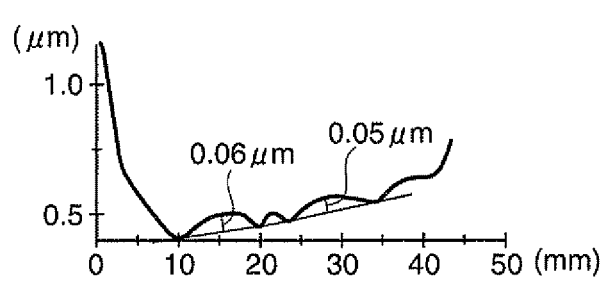
Figure 12D:
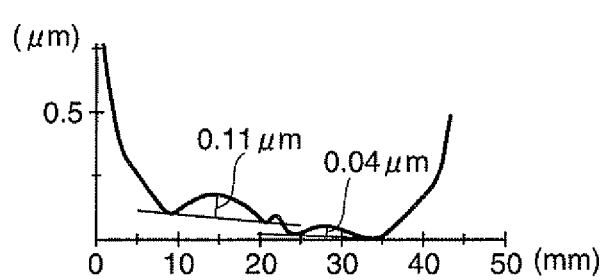
Figure 12E:
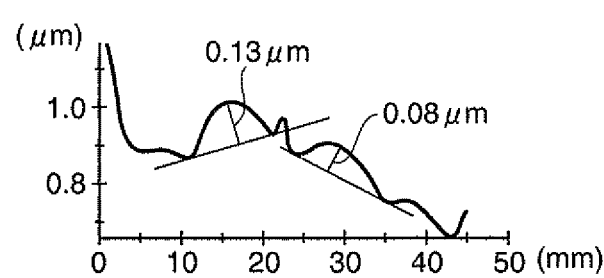
Figure 13A:
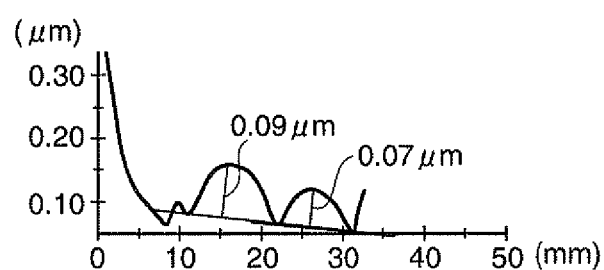
FIGS. 13A-13E show results of flatness test conducted on other embodiment examples of the invention.
Figure 13B:
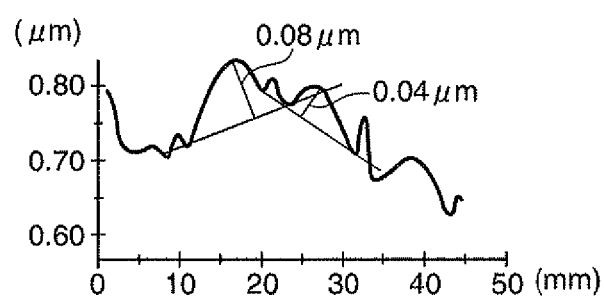
Figure 13C:
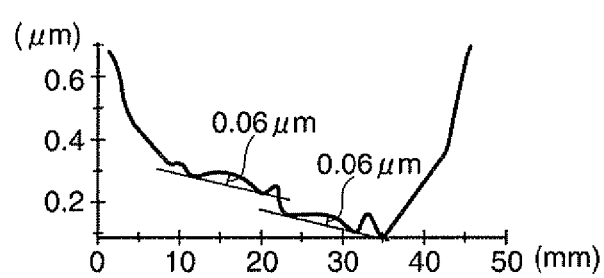
Figure 13D:
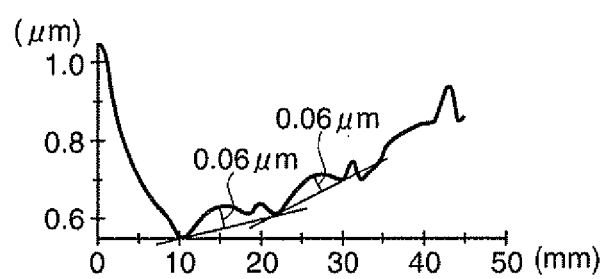
Figure 13E:
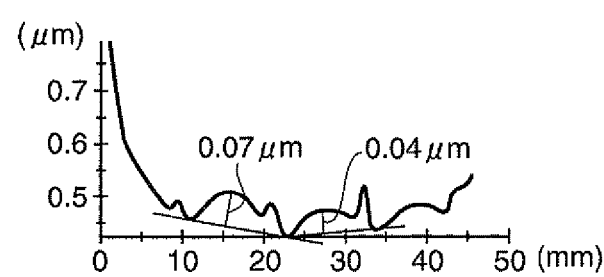

Heat resistance property of adhesive layers to be used in the invention was evaluated according to Embodiment Example 1 and Comparison Example 1. FIG. 11 shows results of heat resistance property tests conducted on Embodiment Example 1 and Comparison Example 1.

In Embodiment Example 1, two glass plates were laminated together with adhesive (UT20 manufactured by ADELL CORPORATION), and then irradiated with ultraviolet light in a predetermined amount. By this process, a test piece 600 was fabricated. On the other hand, in Comparison Example 1, two glass plates were laminated together with adhesive of related art (PHOTO bond 300, manufactured by Sunrise MSI Corporation), and then irradiated with ultraviolet light in a predetermined amount. By this process, a test piece 601 was fabricated.

The test pieces 600 and 601 were affixed within a fixing frame 610, and each of the test samples 600 and 601 was assembled in a place where the polarization conversion element of the projector was supposed to be located. The cooling system of the projector was adjusted such that the temperature of the test piece was set at 120° C. when the test pieces 600 and 601 were irradiated with light of the light source lamp. The test pieces were left in this environment for 3,800 hours, and test results were obtained as shown in FIG. 11. As shown in FIG. 11, yellow discoloration 620 was observed in a portion of the adhesive layer of the test piece 601. On the other hand, no yellow discoloration 620 was observed in the adhesive layer of the test piece 600. Further, the test pieces 600 and 601 were continuously left in this environment, and after 4,800 hours, strong yellow discoloration was observed in the test piece 601. On the other hand, the test piece 600 showed slight yellow discoloration in the adhesive layer, but only to the extent that would not affect its optical property. Therefore, it is understood that the adhesive layer formed from the adhesive in accordance with the invention is excellent in heat resistance property.

Flatness Test

Embodiment Examples 2 Through 11 and Comparison Example 2

Figure 14:
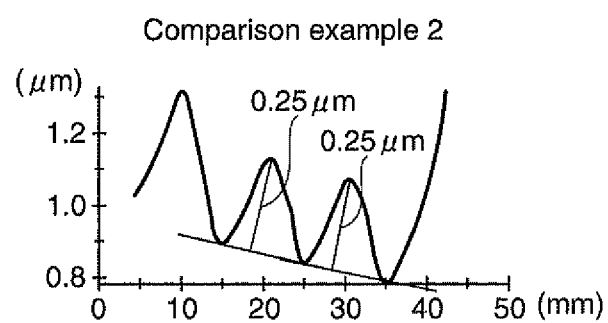
FIG. 14 shows results of flatness test conducted on a comparison example.
Figure 15:
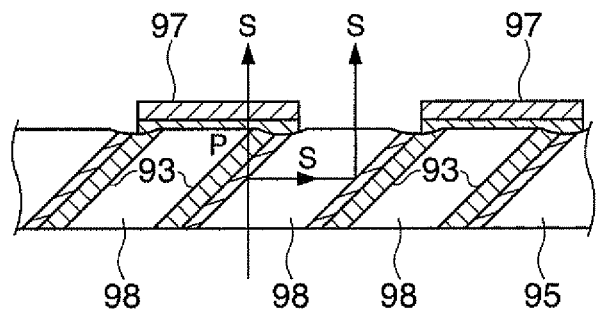
FIG. 15 is a cross-sectional view of a polarization conversion element of related art.

Flatness of light incident surfaces and light emission surfaces in polarization conversion elements in the invention was evaluated according to Embodiment Examples 2 through 11 and Comparison Example 2. FIG. 12 shows results of flatness test conducted on Embodiment Examples 2 through 6 in accordance with the invention, FIG. 13 shows results of flatness test conducted on Embodiment Examples 7 through 11 in accordance with the invention, and FIG. 14 shows results of flatness test conducted on Comparison Example 2.

Embodiment Examples 2 Through 6

In Embodiment Example 2, an element main body 310 shown in FIG. 2 was made using adhesive similar to the adhesive used in Embodiment 1. Then, among two element main bodies 310 on the left and right sides shown in FIG. 2, the element main body 310 on the left side was used. Then, a cross-sectional view of the element main body 310 generally in the center of the light incident surface 310A was obtained by a measurement method described below. It is noted here that the cross-sectional view refers to a cross-sectional view in the left-right direction in FIG. 2. Then, in the obtained cross-sectional view, a convex portion that bulges out relatively greatly to the upper side was selected, and apexes of concave portions adjacent to the convex portion on its left and right sides were connected by a line. The distance from the line to the apex of the convex portion was converted with the scale along the vertical axis to calculate a "high-to-low difference."

In Embodiment Examples 3 through 6, element main bodies 310 were similarly made like Embodiment Example 2, and their light incident surfaces 310A were measured to obtain cross-sectional views. Like Embodiment Example 2, "high-to-low differences" at two points in each Embodiment Example were calculated from the cross-sectional views. The results are shown in FIG. 12.

Embodiment Examples 7 Through 11 and Comparison Example 2

In Embodiment Examples 7 through 11, light emission surfaces 310B of the element main bodies 310 made in Embodiment Examples 2 through 6 were measured in a manner similar to Embodiment Example 2 to obtain cross-sectional views. Like Embodiment Example 2, "high-to-low differences" at two points were calculated in each Embodiment Example from the obtained cross-sectional views.

In Comparison Example 2, an element main body was made in a manner similar to Embodiment Example 2, except that the same adhesive as the adhesive used in Comparison Example 1 was used, and its light emission surface was measured to obtain a cross-sectional view. "High-to-low differences" at two points were calculated from the obtained cross-sectional view, like Embodiment Example 2. Results of Embodiment Examples 7 through 11 and Comparison Example 2 are shown in FIGS. 13 and 14.

Method of Measuring Cross-Sectional View

A parallel light beam was irradiated to the light incident surface or the light emission surface of the element main body by a laser interferometer G102S (manufactured by Fujinon Corporation (currently FUJIFILM Corporation)), a reflected light beam from the element main body and the original parallel light beam are interfered to obtain interference fringes. The wavelength of the light set by the laser interferometer was 685 nm. The obtained interference fringes were analyzed by software for interference fringe analysis (manufactured by Fujinon Corporation (currently FUJIFILM Corporation)), whereby a cross sectional view of the light incident surface or the light emission surface.

As shown in FIGS. 12 and 13, in Embodiment Examples 2 through 11 which use the adhesive in accordance with the invention, the high-to-low differences in the light incident surfaces and the light emission surfaces are small, and therefore it is understood that their flatness was excellent. On the other hand, as shown in FIG. 14, in Comparison Example 2 that uses adhesive in related art, high-to-low differences in the light incident surface are large, and therefore it is understood that its flatness was poor.

INDUSTRIAL USABILITY

The invention can be used as a polarization conversion element to be assembled in a projection apparatus such as a projector.

The entire disclosure of Japanese Patent Application No. 2010-224403, filed Oct. 1, 2010 is expressly incorporated by reference herein.

What is claimed is:

1. A polarization conversion element comprising:
an element main body having a light incident surface and a light emission surface that are generally in parallel with each other, and a phase difference plate bonded to the light emission surface of the element main body,
the element main body including
a plurality of light-transmissive substrates that are sequentially bonded together at a predetermined angle with respect to the light emission surface,
polarization separating films and reflection films that are alternately provided between the plurality of light-transmissive substrates, and
adhesive layers formed between the plurality of light-transmissive substrates, the adhesive layers each being formed from ultraviolet light curing adhesive to a thickness greater than or equal to 5 μm and less than 10 μm, and
the light-transmissive substrates and the phase difference plate being bonded by a bonding layer, the bonding layer being formed by a plasma polymerization method and including siloxane bonds, including Si backbones having a crystallinity of 45% or less and leaving groups composed of organic bases that bond to the Si backbones, and having adhesion that results from ones of the leaving groups present near a surface of the bonding layer from the Si backbones upon application of energy.

2. A polarization conversion element according to claim 1, wherein the phase difference plate is formed from quartz crystal.

3. A polarization conversion unit comprising the polarization conversion element recited in claim 1, and a lens array disposed on a light incident side of the polarization conversion element.

4. A projection apparatus comprising: a light source device that emits light;
the polarization conversion unit recited in claim 3 that converts light emitted from the light source device into one type of polarized light;
a light modulation device that modulates the polarized light from the polarization conversion unit according to image information to form an optical image; and
a projection optical device that magnifies and projects the optical image formed by the optical modulation device.

5. A polarization conversion element according to claim 1, wherein the adhesive layer includes one of modified acrylate and modified methacrylate as a main composition.

6. A polarization conversion element according to claim 5, wherein the phase difference plate is formed from quartz crystal.

7. A polarization conversion unit comprising the polarization conversion element recited in claim 5, and a lens array disposed on a light incident side of the polarization conversion element.

8. A method for manufacturing a polarization conversion element, the method comprising:
a film forming step of alternately providing polarization separating films and reflection films between a plurality of light-transmissive plate members each having a first surface and a second surface that are generally in parallel with each other;
an adhering step of forming adhesive layers between the plurality of light-transmissive plate members, respectively;
a cutting step of cutting the plurality of light-transmissive plate members at a predetermined angle with respect to the first surface and the second surface to form a laminate block having a light incident surface and a light emission surface that are generally in parallel with each other;
a polishing step of polishing the light incident surface and the light emission surface of the laminate block to form an element main body; and a bonding step of bonding a phase difference plate to the light emission surface of the element main body with a bonding layer, the bonding layer being formed by a plasma polymerization method and including siloxane bonds, including Si backbones having a crystallinity of 45% or less and leaving groups composed of organic bases that bond to the Si backbones and having adhesion that results from ones of the leaving groups present near a surface of the bonding layer from the Si backbones upon application of energy,
in the adhering step, the adhesive layers each being formed from ultraviolet light curing adhesive to a thickness greater than or equal to 5 μm and less than 10 μm.

* * * * *